Figure 1:
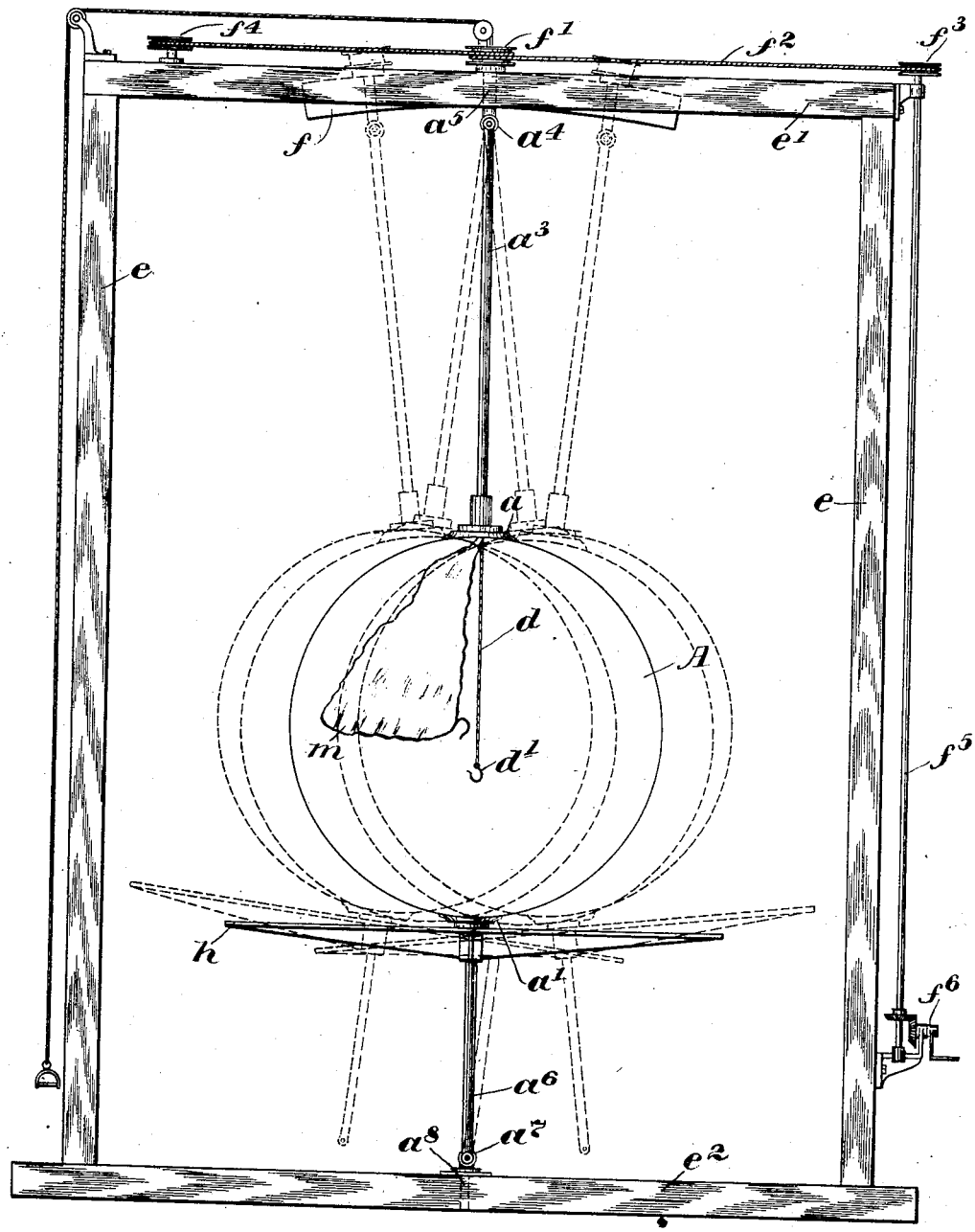

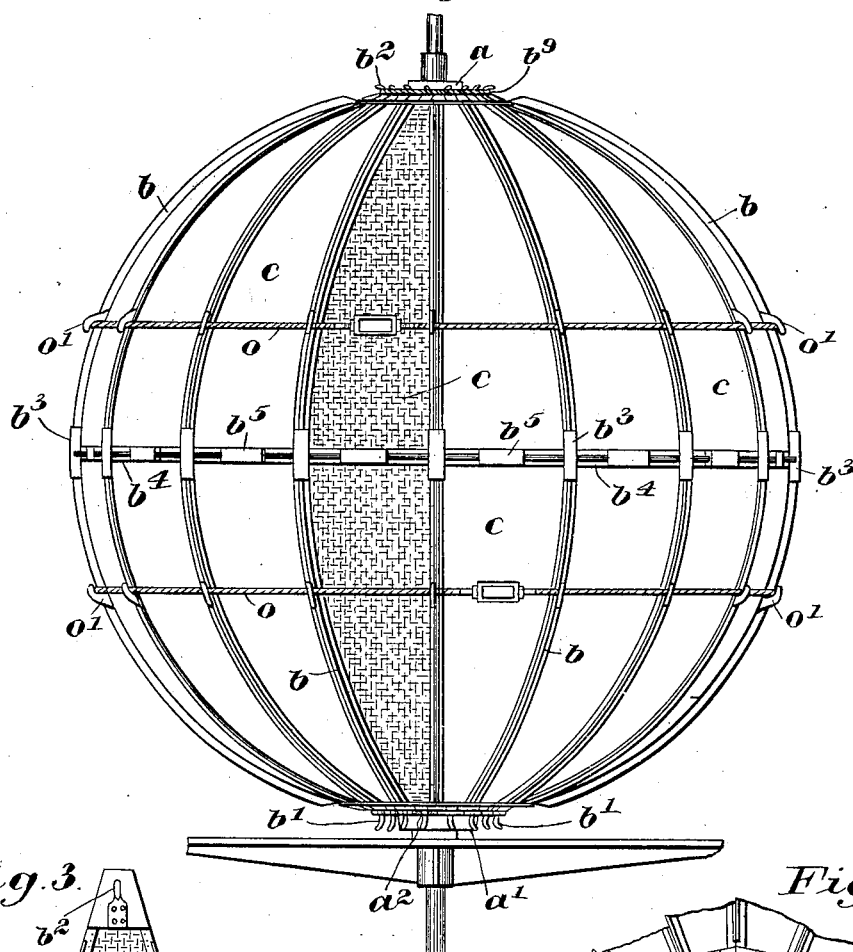
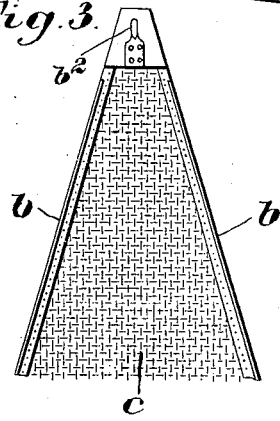
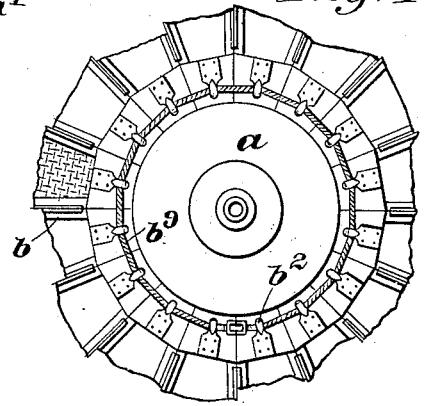

No. 762,232. PATENTED JUNE 7, 1904.
T. W. ECK.
BICYCLE AMUSEMENT APPARATUS.
APPLICATION FILED JAN. 6, 1904.
NO MODEL. 3 SHEETS—SHEET 3.
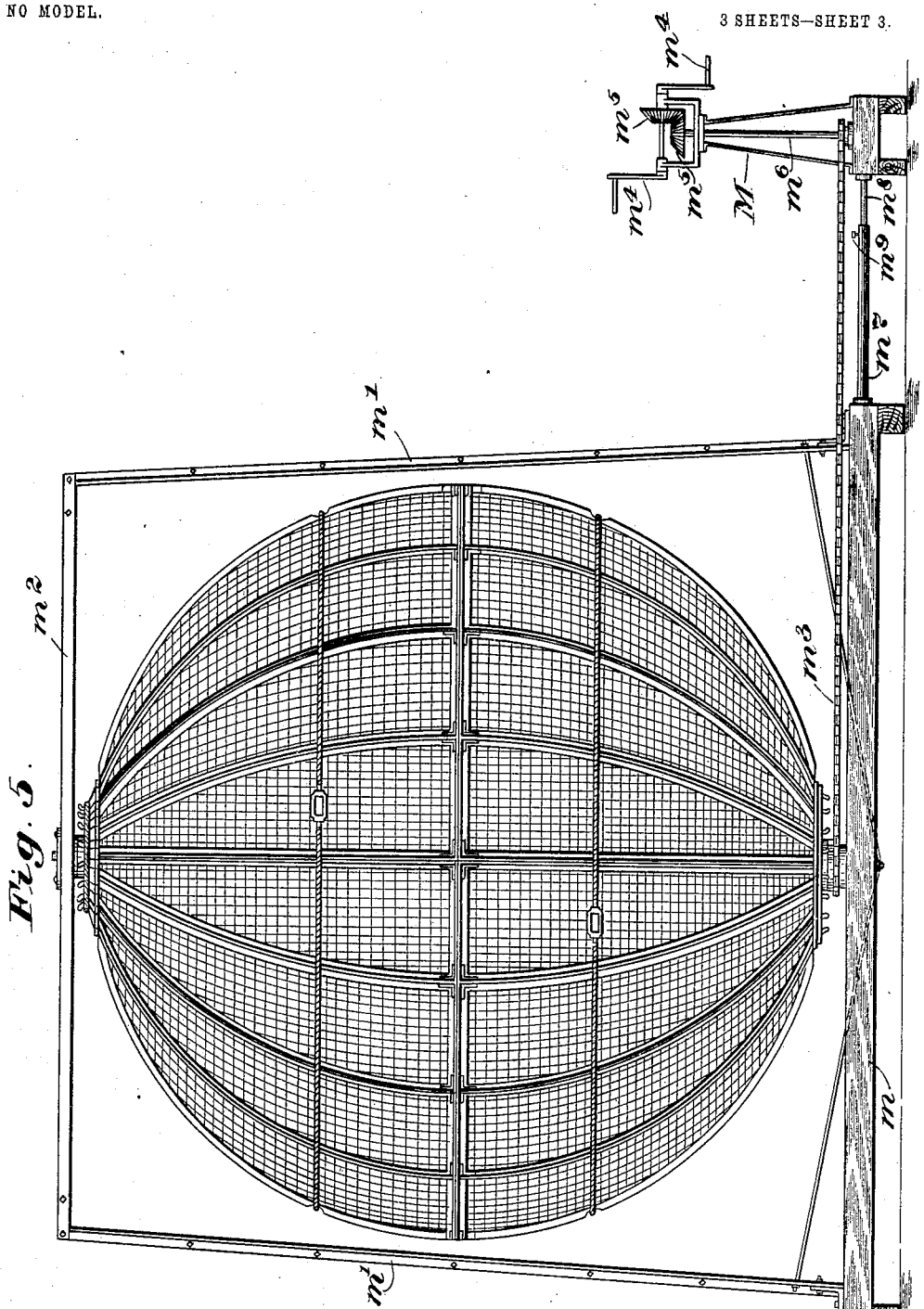
Witnesses.
Horace A. Crossman.
Everett S. Emery.
Inventor:
Thomas W. Eck.
by Emery, Booth & Powell
Attys.

No. 762,232. Patented June 7, 1904.

UNITED STATES PATENT OFFICE.

THOMAS W. ECK, OF NEW YORK, N. Y., ASSIGNOR TO ARTHUR T. PRESCOTT, OF NEW YORK, N. Y.

BICYCLE AMUSEMENT APPARATUS.

SPECIFICATION forming part of Letters Patent No. 762,232, dated June 7, 1904.

Application filed January 6, 1904. Serial No. 187,910. (No model.)

*To all whom it may concern:*

Be it known that I, THOMAS W. ECK, a citizen of the United States, and a resident of New York, in the county of New York and State of New York, have invented an Improvement in Bicycle Amusement Apparatus, of which the following description, in connection with the accompanying drawings, is a specification, like letters on the drawings representing like parts.

This invention aims to provide a novel amusement device or apparatus to be used by a rider of bicycles and the like.

Prior to my invention what is known as the "bicycle-whirl" has been devised and used, consisting of a generally conical and sometimes in part cylindrical inclosure, usually of upright slats, in which the operator rides the bicycle in a circle, gradually climbing the sides of the whirl until he is riding around with his body and machine nearly or quite in a horizontal plane, centrifugal force keeping him in position.

My present invention relates generally to an apparatus used in this manner, and comprehends a spherical hollow whirl or cage within which the rider visibly operates or performs. My invention also comprehends mounting this spherical or, in fact, any whirl so that it may be moved while the rider is operating within. For example, my invention comprehends rotating it about its own axis or shifting its axis either with or without rotating it about its own axis and combining it with other features and devices calculated to add to the amusement effect of the whole. These, with other features of my invention, will be better understood from a description of an apparatus illustrating one embodiment thereof, it being understood, however, that my invention is not limited to the particular embodiment here to be described.

In the drawings, Figure 1 in elevation illustrates generally an apparatus containing one embodiment of my invention. Fig. 2 is an enlarged detail view illustrating one manner of constructing the spherical whirl. Figs. 3 and 4 are details illustrating the construction of the whirl, Fig. 2; and Fig. 5, a view illustrating a different embodiment of my invention.

In the particular embodiment of my invention selected for illustration herein and shown in the drawings, referring first to Fig. 1, the spherical whirl is indicated at A, the same being constructed from desired materials and in desired manner to enable a bicycle-rider to perform within while at the same time visible more or less distinctly from without. The preferred construction of this whirl is illustrated in Figs. 2, 3, and 4. Referring to these figures, I provide the top and bottom hub-castings $a$ $a'$, adapted to receive and support the ends of the arc-shaped ribs $b$. As herein shown, the bottom hub-casting $a'$ is provided with a series of circularly-arranged eye plates or perforations $a^2$, with which may be engaged the hooks $b'$, upon the lower ends of as many ribs $b$, these ribs, so engaged or hooked at their lower ends, having their upper (also hooked) ends $b^2$ brought together toward and at the top casting $a$ and are there firmly secured in suitable manner, as by passing a contractible band $b^9$ around the same. This band may have a turnbuckle or other device by which it may be contracted so as to bind together said upper ends $b^2$ firmly upon and in engagement with the said upper casting $a$. The shuttle-like sections between adjacent ribs $b$ are covered or closed in in suitable manner, as by ordinary woven-wire fabric or netting $c$ of sufficient strength to support the rider between adjacent ribs. Preferably, however, the entire sphere will be divided into halves along its horizontal plane of greatest circumference, the ribs $b$ being divided thereat and detachably connected in suitable manner, as by the clamping devices $b^3$, adjacent ribs at the plane of division being connected, respectively, by the cross-pieces $b^4$, which likewise may be secured one to another by clamping devices $b^5$. By this construction the whirl as a whole may be erected sectionally and therefore more conveniently, and, furthermore, it is made possible to build up the lower hemispherical portion of the whirl and use the same without the remaining top hemispherical portion thereof. One or more of the shuttle-shaped sections or half-sections $c$ may be temporarily omitted for the entrance or exit of the performer. However constructed and of whatever materials it is possible for the performer riding within the whirl in a circular path to mount gradually the inclined sides of the whirl until finally riding at least in the horizontal plane of the division-line at $b^3 b^4$. It is even possible that he might rise above the horizontal plane of greatest circumference of the whirl, especially if aided therein by suitable supports from within which would be invisible from without. For example, the upper hub-casting $a$ may have an axial aperture through which a wire $d$ may be led to the interior of the whirl and provided at its end with a hook or handle $d'$, which might be engaged by the rider and gradually raised from without to assist the rider in riding to attain to a level considerably above the division-line $b^3 b^4$ referred to. Having attained to such unusual level, the rider might release himself from the assisting-wire $d$ or retain his engagement therewith, as seemed desirable or necessary. In any event, however, this wire should be practically invisible from without the whirl, though for clearness not so shown herein. This whirl may be mounted in any desired fashion. In Fig. 1 I have shown it as mounted in an elevated position within a suitable frame comprising the uprights $e\,e$ and the top and bottom cross members $e'\,e^2$. The upper hub-casting $a$ may have a tubular neck $a^3$, which at its upper end is provided with a universal or ball connection $a^4$ with a suspending-shaft $a^5$, also preferably tubular, and mounted herein in an arc-shaped guideway $f$. The bottom hub-casting $a'$ of the whirl may be provided with a similar though depending tubular neck or shaft $a^6$, similarly connected by a universal or ball-and-socket connection $a^7$ with the supporting-shaft $a^8$.

By applying power to either of the connections $a^5$ or $a^8$ (herein shown the connection $a^5$) the whirl may be rotated about its own axis simultaneously with the performance of the rider within, thus to increase the mystifying and entertaining effect of the exhibition. In the present instance I have provided this connection $a^5$ with a sprocket or belt-driven wheel $f'$, which is engaged by an endless belt or chain $f^2$, passed about a driving-wheel $f^3$ at one end and an idler-wheel $f^4$ at its opposite end, whereby to drive the said wheel $f'$ and its connection and the whirl, whatever may be the position of said wheel $f'$, within the length of the belt. The driving-wheel $f^3$ may be driven in suitable manner, as by a shaft $f^5$ and a crank driving device $f^6$, conveniently connected therewith. While the rider is performing within the whirl, the axis of the whirl may be swung from left to right, and vice versa, about the universal connection $a^7$ at the bottom as a fulcrum, it being guided in such movements by the upper connection $a^5$ and the arc-shaped guide $f$ described, and the rotation of the whirl about its own axis may be continued during this vibrating movement, if desired, by the driving connections described or other connections suitable for the purpose, or, if desired, the connection $a^8$ may be disconnected from beneath the whirl and the latter permitted to remain suspended in mid-air from the universal connection $a^4$ at the top, in which position it may be swung like a pendulum or gyrated with its axis describing the surface of a cone with its apex at $a^4$, all while the rider is performing within the whirl and, if desired, simultaneously with the rotation of the whirl about its own axis.

It will be readily apparent that the performance of the rider within the whirl, following always a circular path, would tend in itself to rotate the whirl about its own axis, and therefore the whirl may be self-rotated or automatically rotated by the performance of the rider or by the positive rotating means described. In fact, when suspended or free to be moved bodily the movements of the rider within the whirl may be relied upon to gyrate or swing the whirl either independently or conjointly with the relative movement thereof, all these various effects serving to heighten the amusement or entertainment derived from the performance in connection with the apparatus.

Below the whirl and supported, preferably rigidly, relative thereto is a circular track-table $h$, which may be used by the rider upon the outside of the whirl to operate for conjoint effect with the rider within the whirl, the two, it may be, riding in opposite directions.

Depending within the whirl is a curtain $m$ of suitably-colored material, adapted to be connected with the rider's machine or otherwise operated in connection therewith, so that during the performance it will follow the performer in his circles within the whirl, swinging outwardly by centrifugal action as it is carried around inside and giving a peculiar, preferably generally colored or decorative, effect to the scene, it presenting a moving color scheme following or in conjunction with the operator. This constitutes one form of what, for want of a better term, I call a "mystifying" device, meaning by this a device which contained within the whirl is operated or moved by or in connection with the performer or presented in connection with him in such a manner as to mystify the scene and render it more perplexing to the onlooker than it would otherwise appear.

The assistance-wire $d$ may be carried out at the top of the frame and down at the side thereof, exposed or concealed and provided with a handle at its end, whereby the rider may be raised or lowered or assisted, as desired, while performing within the whirl.

Should occasion require, the whirl may be strengthened circumferentially by bands or hoops $o$ encircling the same and resting in hooks $o'$, provided therefor on the ribs, each hook fitted with a turnbuckle or other means for contracting it, thereby to support the structure against bursting pressure from within.

Whether wholly spherical or hemispherical in shape the whirl herein described is more easily mounted from within than one having straight conical sides or a series of ring-like steps of increasing inclination.

In Fig. 5 I have illustrated an apparatus containing some of the features only of my invention, but which may conveniently be used in shows, &c. The whirl may be constructed as described with reference to Figs. 1 and 2; but it is here shown mounted in a different frame comprising the base $m$, uprights $m'$, and top $m^2$, the whirl being driven by a chain or belt $m^3$ from an operating device M, comprising the cranks $m^4$ and the meshing gears $m^5$, mounted on the driving-shaft $m^6$. This operating device is connected with the whirl-frame by adjustable means, shown as the telescoping rods $m^7$ $m^8$, adjustably held at $m^9$.

I do not herein claim the invention set forth in this application in its broadest terms, since such matter is claimed broadly in my application for an amusement apparatus, filed this 12th day of May, 1904.

This invention obviously is capable of various embodiments, all within the spirit and scope of the present disclosure. Hence my invention is not limited to the embodiment here disclosed.

Having described my invention and without limiting myself in the matter of details, what I claim, and desire to secure by Letters Patent, is—

1. An amusement apparatus comprising a whirl made up of a plurality of frames secured one to another, each frame having wire-netting surfaces stretched across the same.

2. An amusement apparatus comprising a sectional, spherical whirl and means for detachably securing the sections thereof in position.

3. An amusement apparatus comprising a sectional, spherical whirl and means for detachably securing the sections thereof one to another.

4. An amusement apparatus comprising a spherical whirl detachable substantially in halves one part from another.

5. An amusement apparatus comprising a whirl having a hub-like member and sections having ribs adapted to be hooked thereto, and means to secure the outer ends of said sections one to another.

6. An amusement apparatus comprising a knockdown spherical whirl.

7. An amusement apparatus comprising a spherical whirl made up of sections, a hub-like member to which one of the ends of said sections are first attached, and an opposed hub-like member toward which the opposite ends of said sections are ingathered, and means for securing the ingathered ends of said sections to and at said opposed hub-like member.

8. An amusement apparatus comprising a whirl and an assisting device depending axially relative thereto.

9. An amusement apparatus comprising a whirl and an assisting device depending within it adapted to assist a performer during a performance within the whirl.

10. An amusement apparatus comprising a whirl, an assisting device depending within the circle thereof, and means to raise and lower said assisting device.

11. In an amusement apparatus the combination with a whirl of a track-table in juxtaposition thereto.

12. In an amusement apparatus the combination with a whirl of a mystifying device suspended therein.

13. In an amusement apparatus the combination with a whirl of a mystifying device arranged therein and means to move the same in connection with the movements therein of the performer.

14. An amusement apparatus comprising a whirl and means to move it during independent movement of the rider therein.

15. An amusement apparatus comprising a whirl rotatable on a normally vertical axis and means to rotate said whirl and provision for a performance therein.

16. An amusement apparatus comprising a whirl and means to support the same with its axis in different positions.

17. An amusement apparatus comprising a whirl and means to shift the axis thereof during the performance of the rider therein.

18. An amusement apparatus comprising a whirl and means to gyrate the axis thereof.

19. An amusement apparatus comprising a whirl and means to swing the axis thereof.

20. An amusement apparatus comprising a whirl pendent from a single point.

21. An amusement apparatus comprising a whirl, means to change the position thereof, and means to rotate it in any of its positions.

22. An amusement apparatus comprising a whirl and a track-table in juxtaposition thereto and means to rotate both the whirl and track-table.

23. An amusement apparatus comprising a whirl, means to support the same from beneath, and means to change the position of said whirl so supported.

24. In an amusement apparatus a spherical whirl and one or more clamping-bands encircling the same.

In testimony whereof I have signed my name to this specification in the presence of two subscribing witnesses.

THOMAS W. ECK.

Witnesses:
J. C. McKIBBIN,
J. FRANK McCORMACK.